(12) United States Patent
Watanabe et al.

(10) Patent No.: US 9,216,735 B2
(45) Date of Patent: Dec. 22, 2015

(54) HYBRID VEHICLE CONTROL DEVICE AND HYBRID VEHICLE CONTROL METHOD

(71) Applicant: NISSAN MOTOR CO., LTD., Yokohama-shi, Kanagawa (JP)

(72) Inventors: Kei Watanabe, Chigasaki (JP); Takeshi Ohno, Machida (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 32 days.

(21) Appl. No.: 14/414,222

(22) PCT Filed: May 1, 2013

(86) PCT No.: PCT/JP2013/062731
§ 371 (c)(1),
(2) Date: Jan. 12, 2015

(87) PCT Pub. No.: WO2014/010298
PCT Pub. Date: Jan. 16, 2014

(65) Prior Publication Data
US 2015/0166043 A1 Jun. 18, 2015

(30) Foreign Application Priority Data
Jul. 13, 2012 (JP) .................................. 2012-157589

(51) Int. Cl.
B60L 9/00 (2006.01)
B60W 20/00 (2006.01)
B60W 30/18 (2012.01)
B60W 10/06 (2006.01)
B60W 10/08 (2006.01)

(52) U.S. Cl.
CPC ............... B60W 20/10 (2013.01); B60W 10/06 (2013.01); B60W 10/08 (2013.01); B60W 30/18054 (2013.01); Y10S 903/93 (2013.01)

(58) Field of Classification Search
None
See application file for complete search history.

(56) References Cited

U.S. PATENT DOCUMENTS

| 5,934,396 A | 8/1999 | Kurita | |
| 6,671,612 B2 * | 12/2003 | Fuse | 701/112 |
| 2002/0143459 A1 | 10/2002 | Oota et al. | |
| 2002/0163199 A1 | 11/2002 | Ramaswamy et al. | |
| 2012/0072066 A1 * | 3/2012 | Kato et al. | 701/22 |

FOREIGN PATENT DOCUMENTS

| JP | 9-158961 A | 6/1997 |
| JP | 2002-357147 A | 12/2002 |

(Continued)

Primary Examiner — Thomas Tarcza
Assistant Examiner — Adam Alharbi
(74) Attorney, Agent, or Firm — Foley & Lardner LLP

(57) ABSTRACT

A hybrid vehicle control device provided with an engine idle unit for maintaining an engine rotation speed at an idle rotation speed by an engine, a motor idle unit for maintaining the engine rotation speed at the idle rotation speed by a motor generator, a switching unit for switching an idle control between execution of engine idle control and execution of motor idle control in accordance with an operation state of the hybrid vehicle, and an idle control changing unit for changing from the idle control to the engine idle control by adding a load torque portion of the motor generator having been inputted into the engine for maintaining the engine rotation speed at the idle rotation speed during the motor idle control to an output torque of the engine when the idle control is switched from the motor idle control to the engine idle control during the idle operation.

3 Claims, 7 Drawing Sheets

(56) References Cited

FOREIGN PATENT DOCUMENTS

| JP | 2003-41965 A | 2/2003 |
| JP | 2006-57590 A | 3/2006 |
| JP | 2011-98695 A | 5/2011 |
| JP | 2012-30626 A | 2/2012 |

* cited by examiner

__HYBRID VEHICLE CONTROL DEVICE AND HYBRID VEHICLE CONTROL METHOD__

TECHNICAL FIELD

The present invention relates to a hybrid vehicle control device and a hybrid vehicle control method.

BACKGROUND ART

JP2003-41965A discloses a hybrid vehicle control device as a conventional hybrid vehicle control device in which during an idle operation, execution of an engine idle control for maintaining an engine rotation speed at an idle rotation speed by controlling an engine torque (intake air amount) or execution of motor idle control for maintaining the engine rotation speed at the idle rotation speed by controlling a motor generator torque is switched in accordance with a battery storage amount or the like.

SUMMARY OF INVENTION

During the motor idle control, a load torque for maintaining the engine rotation speed at the idle rotation speed is inputted from the motor generator to the engine. If the motor idle control is switched to the engine idle control without considering such load torque inputted into the engine, there is a problem that a temporary drop or blow-up in the engine rotation speed occurs at the switching.

The present intention was made in view of such problems and has an object to suppress the temporary drop or blow-up in the engine rotation speed when the motor idle control is switched to the engine idle control.

According to an aspect of the present invention, a hybrid vehicle control device provided with an engine and a motor generator as power sources is provided. And the hybrid vehicle control device includes, during an idle operation in which an engine rotation speed is maintained at an idle rotation speed in a state in which the engine and the motor generator are connected, an engine idle unit adapted to execute the engine idle control for maintaining the engine rotation speed at the idle rotation speed by the engine, a motor idle unit adapted to execute the motor idle control for maintaining the engine rotation speed at the idle rotation speed by the motor generator during the idle operation, a switching unit adapted to switch between execution of the engine idle control and execution of the motor idle control in accordance with an operation state of the hybrid vehicle, and an idle control changing unit adapted to change to the engine idle control by adding a load torque portion of the motor generator having been inputted into the engine for maintaining the engine rotation speed at the idle rotation speed during the motor idle control to an output torque of the engine when the motor idle control is switched to the engine idle control during the idle operation.

Embodiments of the present invention and advantages of the present invention will be explained below in detail by referring to the attached drawings.

DESCRIPTION OF EMBODIMENTS

First Embodiment

Figure 1:
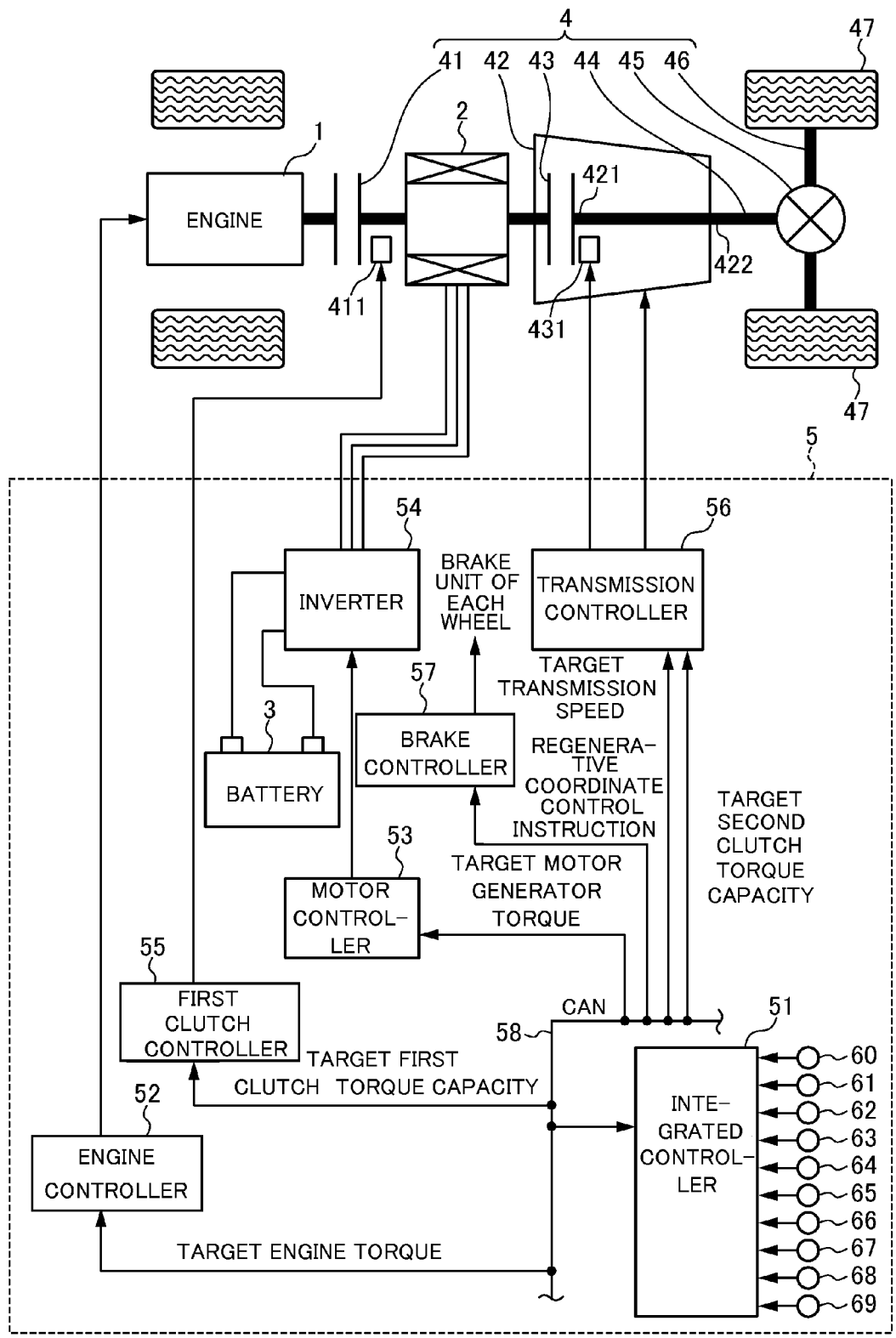
FIG. 1 is an outline configuration view of a front engine/rear drive hybrid vehicle according to a first embodiment of the present invention.

FIG. 1 is an outline configuration view of a front engine/rear drive hybrid vehicle (hereinafter referred to as "FR hybrid vehicle") according to this embodiment.

The FR hybrid vehicle includes an engine 1 and a motor generator 2 as power sources, a battery 3 as an electricity source, a driving system 4 composed of a plurality of components for transmitting an output of the power sources to rear wheels 47, and a control system 5 composed of a plurality of controllers for controlling components of the engine 1, the motor generator 2, and the driving system 4.

The engine 1 is a gasoline engine. A diesel engine can be also used.

The motor generator 2 is a synchronous motor generator in which a permanent magnet is embedded in a rotor, and a stator coil is wound around a stator. The motor generator 2 has a function as an electric motor rotated and driven upon receipt of supply of electric power from the battery 3 and a function as a power generator for generating electromotive power at both ends of the stator coil when the rotor is rotated by an external force.

The battery 3 supplies electric power to various electric components such as the motor generator 2 and stores electric power generated by the motor generator 2.

The driving system 4 of the FR hybrid vehicle includes a first clutch 41, an automatic transmission 42, a second clutch 43, a propeller shaft 44, a final reduction differential gear device 45, and a drive shaft 46.

The first clutch 41 is provided between the engine 1 and the motor generator 2. The first clutch 41 is a wet multi-disk clutch whose torque capacity can be continuously changed by controlling an oil flow rate and a hydraulic pressure by a first solenoid valve 411. The first clutch 41 is controlled into three states, that is, a fastened state, a slip state (partial clutch state), and released state by changing a torque capacity.

The automatic transmission 42 is a stepped transmission with forward 7 speeds/reverse 1 speed. The automatic transmission 42 includes four sets of planetary gear mechanisms and a plurality of friction fastening elements (three sets of multi-disk clutches, four sets of multi-disk brakes, two sets of one-way clutches) connected to a plurality of rotating elements constituting the planetary gear mechanisms and changing their link states. A transmission speed is switched by adjusting a supply hydraulic pressure to each of the friction fastening elements and by changing fastened/released state of each of the friction fastening elements.

A second clutch 43 is a wet multi-disk clutch which can continuously change a torque capacity by controlling the oil flow rate and the hydraulic pressure by a second solenoid valve 431. The second clutch 43 is controlled to three states, that is, a fastened state, a slip state (partial clutch state) and a released state by changing the torque capacity. In this embodiment, a part of the plurality of friction fastening elements provided in the automatic transmission 42 is also used as the second clutch 43.

A propeller shaft 44 connects an output shaft of the automatic transmission 42 to an input shaft of the final reduction differential gear device 45.

The final reduction differential gear device 45 integrates a final reduction device and a differential device together and transmits rotation of the propeller shaft 44 after reduction to right and left drive shafts 46. When a speed difference needs to be generated between rotation speeds of the right and left drive shafts 46 as during running in curve or the like, the speed difference is automatically given so as to realize smooth running. At distal ends of the right and left drive shafts 46, rear wheels 47 are mounted, respectively.

The control system 5 of an FR hybrid vehicle includes an integrated controller 51, an engine controller 52, a motor controller 53, an inverter 54, a first clutch controller 55, a transmission controller 56, and a brake controller 57. Each of the controllers is connected to a CAN (Controller Area Network) communication line 58 so that data can be transmitted/received mutually via CAN communication.

Into the integrated controller 51, detection signals of various sensors for detecting a running state of the FR hybrid vehicle such as an accelerator stroke sensor 60, a car speed sensor 61, an engine rotation sensor 62, a motor generator rotation sensor 63, a transmission input rotation sensor 64, a transmission output rotation sensor 65, a SOC (State Of Charge) sensor 66, a wheel speed sensor 67, a brake stroke sensor 68, an acceleration sensor 69 and the like are inputted.

The accelerator stroke sensor 60 detects a stepped amount on an accelerator pedal (hereinafter referred to as an "accelerator operation amount") indicating a requested driving torque by a driver. The car speed sensor 61 detects a running speed of the FR hybrid vehicle (hereinafter referred to as a "car speed"). The engine rotation sensor 62 detects an engine rotation speed. The motor generator rotation sensor 63 detects a motor generator rotation speed. The transmission input rotation sensor 64 detects a rotation speed of an input shaft 421 of the automatic transmission 42 (hereinafter referred to as a "transmission input rotation speed"). The transmission output rotation sensor 65 detects a rotation speed of an output shaft 422 of the automatic transmission 42. The SOC sensor 66 detects a battery storage amount. The wheel speed sensor 67 detects each wheel speed of the four wheels. The brake stroke sensor 68 detects a stepped amount of a brake pedal (hereinafter referred to as a "brake operation amount"). The acceleration sensor 69 detects a longitudinal acceleration of the hybrid vehicle.

The integrated controller 51 controls consumed energy of the entire FR hybrid vehicle, selects either one of an EV (Electric Vehicle) running mode or an HEV (Hybrid Electric Vehicle) running mode as a target running mode on the basis of the inputted detection signals of the various sensors in order to allow the FR hybrid vehicle to run at the maximum efficiency, and calculates a control instruction value for outputting it to each of the controllers. Specifically, a target engine torque, a target motor generator torque, a target first clutch torque capacity, a target second clutch torque capacity, a target transmission speed, a regenerative coordinate control instruction and the like are calculated as control instruction values and outputted to each of the controllers.

The EV running mode is a running mode in which the first clutch 41 is released and the FR hybrid vehicle is driven only by the motor generator 2 as a power source.

The HEV running mode is a running mode in which the first clutch 41 is fastened, and the FR hybrid vehicle is driven including the engine 1 as the power source and includes three running modes, that is, an engine running mode, a motor assist running mode, and a power generation running mode.

The engine running mode is a mode for driving the FR hybrid vehicle using only the engine 1 as a power source. The motor assist running mode is a mode for driving the FR hybrid vehicle using the engine 1 and the motor generator 2 as two power sources. The power generation running mode is a mode for driving the FR hybrid vehicle using only the engine 1 as a power source and making the motor generator 2 function as a power generator.

Into the engine controller 52, the target engine torque calculated in the integrated controller 51 is inputted via the CAN communication line 58. The engine controller 52 controls an intake air amount (opening degree of a throttle valve), a fuel injection amount, ignition timing and the like of the engine 1 so that the engine torque becomes the target engine torque.

Into the motor controller 53, the target motor generator torque calculated in the integrated controller 51 is inputted via the CAN communication line 58. The motor controller 53 controls the inverter 54 so that a motor torque becomes the target motor generator torque.

The inverter 54 is an electric current converter for mutually converting two kinds of electricity, that is, DC and AC. The inverter 54 converts the DC from the battery 3 to a three-phase AC with an arbitrary frequency so that the motor torque becomes the target motor generator torque and supplies it to the motor generator 2. On the other hand, when the motor generator 2 functions as a power generator, the three-phase AC from the motor generator 2 is converted to the DC and supplied to the battery 3.

Into the first clutch controller 55, the target first clutch torque capacity calculated in the integrated controller 51 is inputted via the CAN communication line 58. The first clutch controller 55 controls the first solenoid valve 411 so that the torque capacity of the first clutch 41 becomes the target first clutch torque capacity.

Into the transmission controller 56, the target second clutch torque capacity and the target transmission speed calculated in the integrated controller 51 are inputted via the CAN communication line 58. The transmission controller 56 controls the second solenoid valve 431 so that the torque capacity of the second clutch 43 becomes the target second clutch torque capacity. Moreover, a supply hydraulic pressure to each of the friction fastening elements of the automatic transmission 42 is controlled so that the transmission speed of the automatic transmission 42 becomes the target transmission speed.

Into the brake controller 57, a regenerative coordinate control instruction from the integrated controller 51 is inputted. If a regenerative braking torque by the motor generator is insufficient for a requested braking force calculated from the brake operation amount when the brake pedal is stepped, the brake controller 57 executes regenerative coordinate brake control on the basis of the regenerative coordinate control instruction so that the shortage is compensated for by a friction braking torque by the brake.

Here, when the FR hybrid vehicle is stopped, the EV running mode is basically selected, and the engine is brought into a stop state. However, if the engine is in a cold engine state such as at start of the FR hybrid vehicle, in order to activate a catalyst by warming up the engine earlier, the HEV running mode is selected even while the vehicle is stopped, and the engine is started in a state in which the first clutch is fastened in some cases. In this case, after the engine is started, idle operation is performed still in the HEV running mode in which the first clutch is fastened, and idle control for maintaining the engine rotation speed at the idle rotation speed by feedback control is executed.

As a method of idle control in this HEV running motor, there are two kinds of methods, that is, the idle control (engine idle control) in which the motor generator torque is controlled to a predetermined target generator torque, while the engine torque (intake air amount) is subjected to feedback control so that the engine rotation speed is maintained at the idle rotation speed and the idle control (motor idle control) in which the engine torque is controlled to a predetermined target engine torque, while the motor generator torque is subjected to the feedback control so that the engine rotation speed is maintained at the idle rotation speed.

In this embodiment, in the idle operation in the HEV running mode, execution of the engine idle control and execution of the motor idle control is switched in accordance with an operation state of the FR hybrid vehicle.

Specifically, in the idle operation in the HEV running mode, the motor idle control in which the feedback control is executed by the motor generator which is basically excellent in responsiveness and controllability is executed. As a result, the idle operation more stable than in the engine idle control can be executed, and thus, ignition timing can be delayed that in the engine idle control, and warming-up of the engine can be promoted. The engine idle control is executed only when execution of the motor idle control is difficult such as a case in which the battery SOC becomes extremely small, for example.

Here, depending on the operation state of the FR hybrid vehicle, control needs to be switched from the motor idle control to the engine idle control during the idle operation in the HEV running mode.

During the motor idle control, a feedback torque of the motor generator calculated on the basis of a deviation between an actual engine rotation speed and the target idle rotation speed (hereinafter referred to as a "F/B motor generator torque") is inputted into the engine as a load. However, if the control is switched from the motor idle control to the engine idle control, this F/B motor generator torque becomes zero. Thus, if the control is simply switched from the motor idle control to the engine idle control, it was known that such problem occurred that the engine rotation speed temporarily drops or blows up for a portion that the F/B motor generator torque becomes zero at switching.

Thus, in this embodiment, at switching from the motor idle control to the engine idle control, by executing the engine idle control by taking over the F/B motor generator torque in the motor idle control as the feedback torque of the engine (hereinafter referred as a "F/B engine torque"), the temporary drop or blow-up of the engine rotation speed at the switching is suppressed. The idle control in the HEV running mode according to this embodiment will be explained below.

Figure 2:
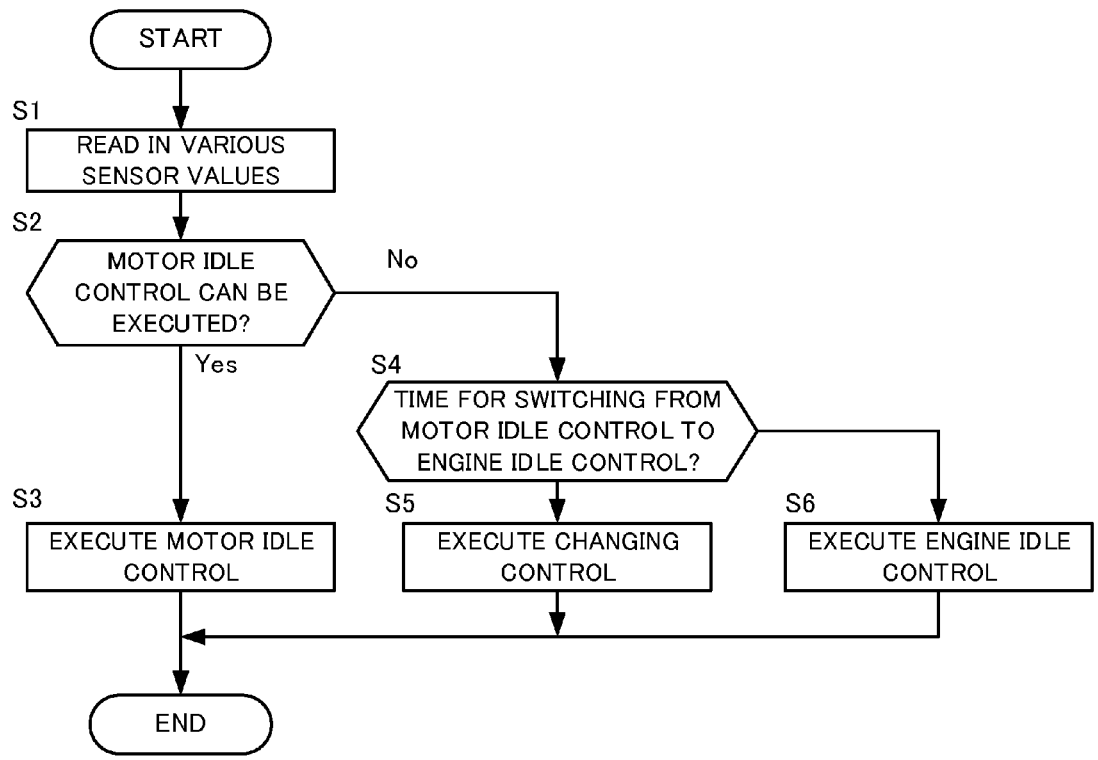
FIG. 2 is a flowchart for explaining idle control in a HEV running mode according to the first embodiment of the present invention.

FIG. 2 is a flowchart explaining the idle control in the HEV running mode according to this embodiment.

At Step S1, the integrated controller 51 reads in detected values of the various sensors.

At Step S2, the integrated controller 51 determines whether the motor idle control can be executed or not on the basis of the battery SOC, a battery temperature, a battery input/output current and the like. If it is determined that the motor idle control can be executed, the integrated controller 51 executes processing at Step S2, while if it is determined that the motor idle control cannot be executed, the integrated controller 51 executes processing at Step S3.

At Step S3, the integrated controller 51 executes the motor idle control. During the motor idle control, as described above, while the engine torque is controlled to the predetermined target engine torque, the motor generator torque is subjected to feedback control so that the engine rotation speed is maintained at the idle rotation speed. Moreover, the ignition timing is delayed from basic ignition timing set in the engine idle control.

At Step S4, the integrated controller 51 determines whether it is switching time from the motor idle control to the engine idle control or not. If it is the switching time from the motor idle control to the engine idle control, the integrated controller 51 executes processing at Step S5. On the other hand, if it is not the switching time from the motor idle control to the engine idle control, processing at Step S6 is executed.

At Step S5, the integrated controller 51 executes changing control from the motor idle control to the engine idle control. Specifically, the F/B motor generator torque during the motor idle control is taken over as the F/B engine torque is changed to the engine idle control.

At Step S6, the integrated controller 51 executes the engine idle control. During the engine idle control, as described above, while the motor generator torque is controlled to the predetermined target generator torque, the engine torque (intake air amount) is subjected to feedback control so that the engine rotation speed is maintained at the idle rotation speed.

Figure 3:
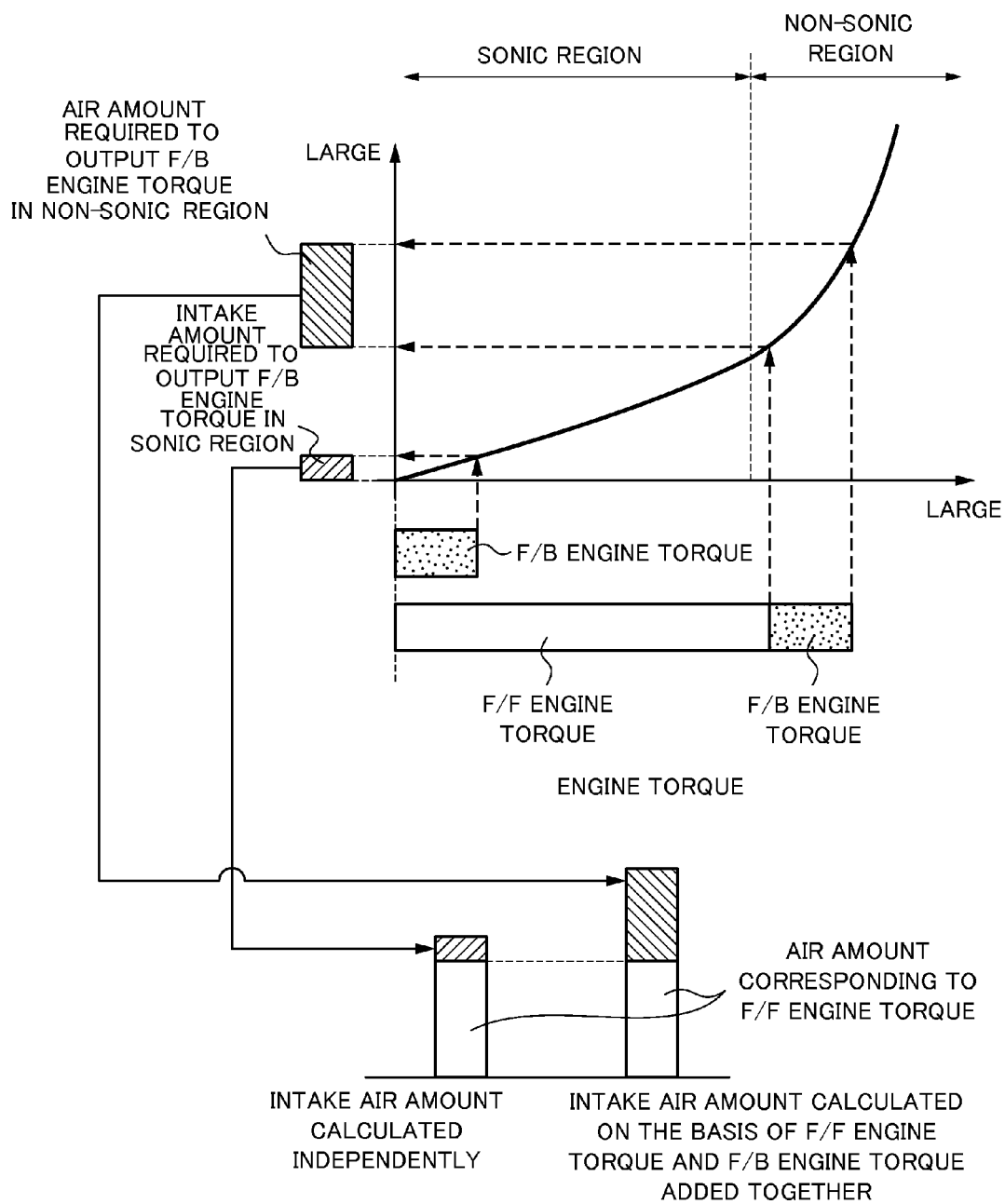
FIG. 3 is a view for explaining a taking-over method of an F/B motor generator torque at switching from motor idle control to engine idle control.

FIG. 3 is a view for explaining a taking-over method of the F/B motor generator torque at switching from the motor idle control to the engine idle control.

As illustrated in FIG. 3, during the engine idle control, that the F/B engine torque is added to a feed forward torque of the engine calculated on the basis of an engine load, an engine water temperature, ignition timing and the like (hereinafter referred to as an "F/F engine torque") is calculated as a target engine torque. On the basis of this target engine torque, a target intake air amount is calculated from a table in FIG. 3, and an opening degree of a throttle valve is controlled so that the target intake air amount is obtained.

Here, a relationship between the engine torque and the intake air amount will be explained, and as illustrated in FIG. 3, until the engine torque becomes the predetermined engine torque, a required intake air amount linearly increases in accordance with an increase in the engine torque. However, when the engine torque exceeds the predetermined engine torque, it enters a so-called non-sonic region, and the required intake air amount non-linearly increases in accordance with the increase in the engine torque.

Therefore, as illustrated in FIG. 3, the intake air amount required to output the engine torque corresponding to the F/B motor generator torque portion becomes different between a sonic region and the non-sonic region. Then, if the intake air amount obtained by adding intake air amounts calculated independently from the F/F engine torque and the F/B engine torque together and the intake air amount calculated on the basis of a torque obtained by adding the F/F engine torque and the F/B engine torque together are compared, the former intake air amount is smaller. That is, in the case of the former, even if the F/B motor generator torque is taken over as the F/B engine torque, the intake air amount required to output the engine torque corresponding to the F/B motor generator torque portion cannot be supplied any longer.

Thus, in this embodiment, when the F/B motor generator torque is to be taken over as the F/B engine torque, the target intake air amount is calculated on the basis of the engine torque obtained by adding the F/F engine torque and the F/B motor generator torque taken over as the F/B engine torque.

As a result, even if the engine torque obtained by adding the F/F engine torque and the F/B motor generator torque taken over as the F/B engine torque is in the non-sonic region, the intake air amount does not run short. Thus, at the switching from the motor idle control to the engine idle control, the F/B motor generator torque portion can be reliably compensated for by the engine torque.

Figure 4:
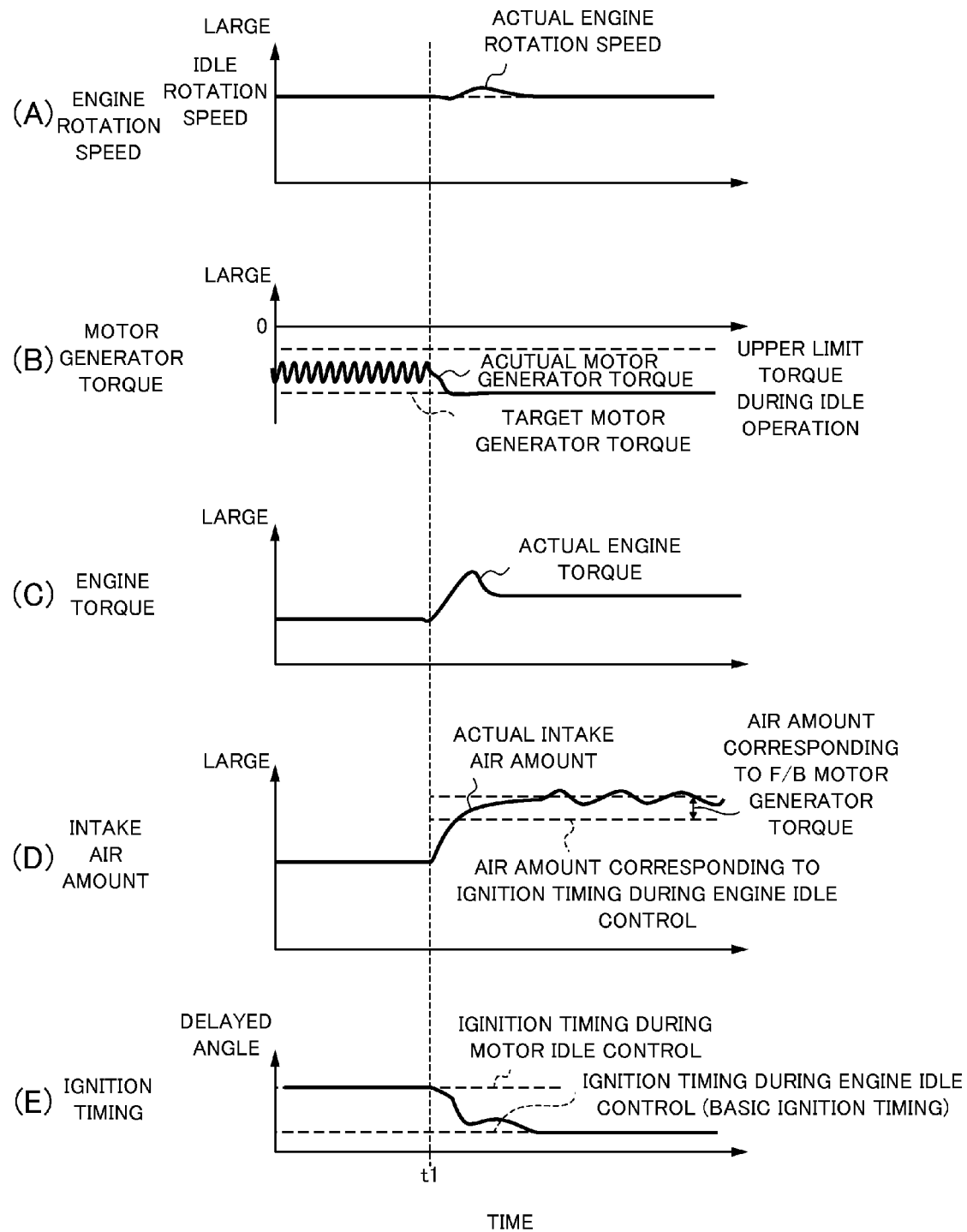
FIG. 4 is a time chart for explaining an operation of idle control in the HEV running mode according to the first embodiment of the present invention.

FIG. 4 is a time chart for explaining an operation of the idle control in the HEV running mode according to this embodiment.

After the engine is started, the motor idle control is executed until time t1. During the motor idle control, the engine torque is controlled to the predetermined target engine torque (FIG. 4(C)), and the motor generator torque is subjected to feedback control (FIG. 4(B)). As a result, the engine rotation speed is maintained at the idle rotation speed (FIG. 4(A)). In an example in FIG. 4, the target motor generator torque during the idle control is a negative value, and power is generated by the motor generator 2. Moreover, in the example in FIG. 4, the intake air amount is subjected to feed forward control so that the engine torque becomes the predetermined target engine torque, and since the actual engine torque is smaller than the target engine torque and thus, the actual motor generator torque becomes larger than the target motor generator torque (negative torque becomes smaller) by the feedback control, whereby the idle rotation speed is maintained. At this time, the F/B motor generator torque is a positive value.

When the motor idle control is switched to the engine idle control at the time t1, the F/B motor generator torque during the motor idle control is taken over as the F/B engine torque. As a result, at the time t1, the intake air amount corresponding to the F/B motor generator torque portion is added (FIG. 4(D)), and thus, temporary drop or blow-up of the engine rotation speed at the switching can be suppressed (FIG. 4(A)). In this example, since the F/B motor generator torque is a positive value, the addition (increase) of the intake air amount was made, but if the F/B motor generator torque is a negative value, the intake air amount is decreased, and temporary blow-up of the engine rotation speed at the switching can be suppressed.

Moreover, when the motor idle control is switched to the engine idle control at the time t1, the ignition timing is gradually advanced to the ignition timing (basic ignition timing) for the engine idle control.

At the time t1 and after, the engine idle control is executed. During the engine idle control, the motor generator torque is controlled to the predetermined target generator torque (FIG. 4(B)), and the engine torque (intake air amount) is feedback controlled (FIG. 4(D)). As a result, the engine rotation speed is maintained at the idle rotation speed (FIG. 4(A)).

According to this embodiment explained above, when the motor idle control is switched to the engine idle control during the idle operation in the HEV running mode, the F/B motor generator torque during the motor idle control is taken over as the F/B engine torque, and the engine idle control is executed. That is, the load torque portion (F/B motor generator torque portion) of the motor generator having been inputted into the engine in order to maintain the engine rotation speed at the idle rotation speed during the motor idle control is added to the output torque of the engine and is changed to the engine idle control.

As a result, when the motor idle control is switched to the engine idle control, temporary drop or blow-up in the engine rotation speed which is caused since the F/B motor generator torque becomes zero and the engine load rapidly changes can be suppressed.

Moreover, according to this embodiment, when the F/B motor generator torque taken over as the F/B motor engine torque is to be converted to the target intake air amount, the F/F engine torque to which the F/B motor generator torque is added is converted to the target intake air amount as the target engine torque.

As a result, at switching from the motor idle control to the engine idle control, the F/B generator torque portion can be reliably compensated for by the engine torque.

Second Embodiment

Subsequently, a second embodiment of the present invention will be explained by referring to FIG. 5. This embodiment is different from the first embodiment in a point in which the taken-over F/B engine torque is corrected in accordance with a delayed angle amount of the ignition timing. The difference will be mainly explained below. In each of the embodiments described below, the same reference numerals are used for portions performing the functions similar to those in the above-described first embodiment, and duplicated explanation will be omitted as appropriate.

As described above, in the motor idle control, the idle operation more stable than that of during the engine idle control is possible and thus, the ignition timing can be delayed than that of during the engine idle control.

Here, in the first embodiment, the F/F engine torque is calculated in addition to the engine load or the engine water temperature, considering the ignition timing, but an influence of the ignition timing is not considered for the taken-over F/B engine torque.

Thus, in this embodiment, when the F/B motor generator torque is taken over as the F/B engine torque, the F/B engine torque is corrected in accordance with the delayed angle amount of the ignition timing.

Figure 5:
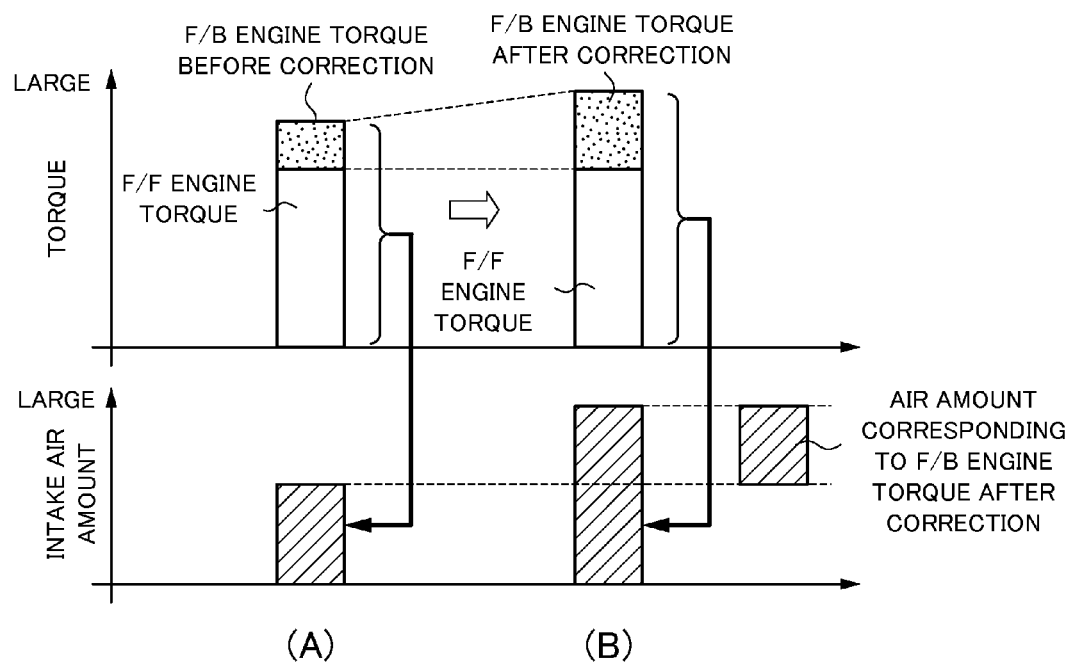
FIG. 5 are views for explaining a correction method of the F/B engine torque according to a second embodiment of the present invention.

FIG. 5 are views for explaining a correcting method of the F/B engine torque according to this embodiment.

As illustrated in FIG. 5(A), in the first embodiment, when the F/B motor generator torque is taken over as the F/B engine torque and its F/B engine torque portion is converted into an intake air amount, the converted intake air amount becomes the intake air amount required to output the F/B engine torque in the state in which the ignition timing is made the basic ignition timing usually set during the engine idle control.

Thus, if the ignition timing has been delayed during the motor idle control, the intake air amount runs short when switching is made to the engine idle control, and there is a concern that the engine rotation speed might drop temporarily.

Thus, in this embodiment, as illustrated in FIG. 5(B), the taken-over F/B engine torque is increasingly corrected in accordance with the delayed angle amount of the ignition timing, and the corrected F/B engine torque portion is converted into the intake air amount.

As a result, even if the ignition timing has been delayed, the intake air amount does not run short at the switching from the motor idle control to the engine idle control, and a temporary drop of the engine rotation speed can be suppressed.

The embodiments of the present invention are explained as above, but the embodiments illustrate only a part of application examples of the present invention and are not intended to limit a technical scope of the present invention to the specific configurations of the above-described embodiments.

Figure 6:
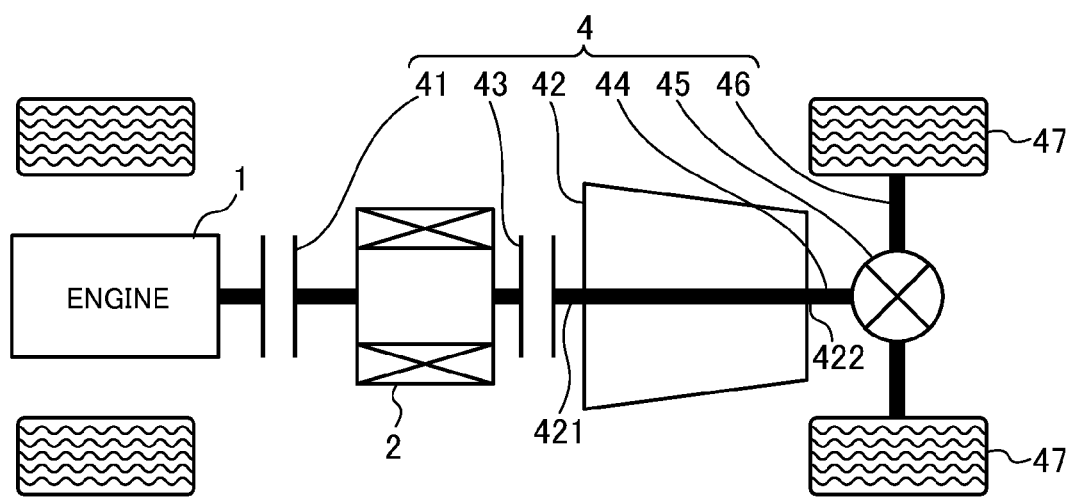
FIG. 6 is an outline configuration view of a front engine/rear drive hybrid vehicle according to another embodiment of the present invention.
Figure 7:
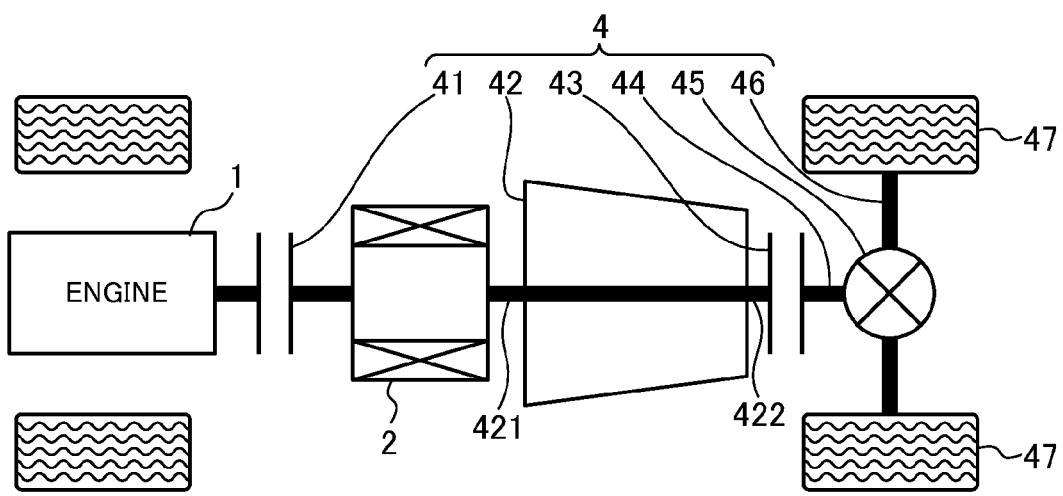
FIG. 7 is an outline configuration view of a front engine/rear drive hybrid vehicle according to another embodiment of the present invention.

For example, the second clutch 43 of the FR hybrid vehicle may be provided separately between the motor generator 2 and the automatic transmission 42 as illustrated in FIG. 6 or may be provided separately in the rear of the automatic transmission 42 as illustrated in FIG. 7. They are not limiting, and it is only necessary that the second clutch 43 is provided anywhere between the motor generator 2 and the driving wheel.

Moreover, in each of the above-described embodiments, the stepped transmission with forward 7 speeds/reverse 1 speed is used as the automatic transmission 42, but the number of transmission speeds is not limited to that, and a continuously variable transmission can be also used.

The present application claims for priority based on Japanese Patent Application No. 2012-157589 filed with Japan Patent Office on Jul. 13, 2012, and the whole contents of this application are incorporated in this Description by reference.

The invention claimed is:

1. A hybrid vehicle control device provided with an engine and a motor generator as power sources, comprising:
    an engine idle unit adapted to execute the engine idle control for maintaining the engine rotation speed at the idle rotation speed by the engine during an idle operation in which an engine rotation speed is maintained at an idle rotation speed in a state in which the engine and the motor generator are connected;
    a motor idle unit adapted to execute the motor idle control for maintaining the engine rotation speed at the idle rotation speed by the motor generator during the idle operation;
    a switching unit adapted to switch an idle control between execution of the engine idle control and execution of the motor idle control in accordance with an operation state of the hybrid vehicle; and
    an idle control changing unit adapted to change the idle control to the engine idle control by adding a load torque portion of the motor generator having been inputted into the engine for maintaining the engine rotation speed at the idle rotation speed during the motor idle control to an output torque of the engine when the idle control is switched from the motor idle control to the engine idle control during the idle operation;
    wherein the idle control changing unit changes to the engine idle control by increasing an intake air amount of the engine only by the intake air amount required for the engine to output the output torque corresponding to a load torque portion of the motor generator,
    wherein the idle control changing unit determines the intake air amount portion to be increased by considering a non-sonic region.

2. The hybrid vehicle control device according to claim 1, wherein
    the engine idle unit executes feedback control for setting a feedback correction amount of an output torque of the engine so that the engine rotation speed becomes the idle rotation speed;
    the motor idle unit executes the feedback control for setting the feedback correction amount of an output torque of the motor generator so that the engine rotation speed becomes the idle rotation speed;
    the idle control changing unit takes over a feedback correction amount of the output torque of the motor generator during the motor idle control as a feedback correction amount of an output torque of the engine and adds a load torque portion of the motor generator to the output torque of the engine.

3. The hybrid vehicle control device according to claim 1, further comprising:
    an ignition timing control unit adapted to delay ignition timing of the engine during the motor idle control more than in the engine idle control; and
    the idle control changing unit corrects the intake air amount to be increased on the basis of a delayed angle amount of ignition timing.

\* \* \* \* \*